United States Patent [19]

Horwood et al.

[11] Patent Number: 5,778,821
[45] Date of Patent: Jul. 14, 1998

[54] RESTRICTED FLOW POULTRY FEEDER

[75] Inventors: Francis Hedley Horwood; Francis Hedley Horwood, Jr., both of New South Wales, Australia

[73] Assignee: F&M Horwood Nominees Pty. Ltd., Auburn, Australia

[21] Appl. No.: 589,377

[22] Filed: Jan. 22, 1996

[30] Foreign Application Priority Data

Jan. 23, 1995 [AU] Australia .................. PN0696
Nov. 17, 1995 [AU] Australia .................. PN6655

[51] Int. Cl.⁶ .................................................. A01K 39/012
[52] U.S. Cl. .................................................. 119/53; 119/57.4
[58] Field of Search .................. 119/57.4, 53, 56.1, 119/51.11

[56] References Cited

U.S. PATENT DOCUMENTS

| | | | |
|---|---|---|---|
| 2,087,813 | 7/1937 | Peterson | 119/53 |
| 3,807,359 | 4/1974 | Hostetler | 119/57.4 |
| 4,089,300 | 5/1978 | Keen et al. | 119/57.4 |
| 4,348,988 | 9/1982 | Lawson | 119/53 |
| 4,554,888 | 11/1985 | Gross | 119/53 |
| 5,101,765 | 4/1992 | Manfrin | 119/53 |
| 5,406,907 | 4/1995 | Hart | 119/57.4 X |

Primary Examiner—Robert P. Swiatek
Assistant Examiner—Elizabeth Shaw
Attorney, Agent, or Firm—Ladas & Parry

[57] ABSTRACT

A poultry feeder system is described having a driven auger mounted in a distribution pipe. A plurality of poultry feeders depend from the distribution pipe and are supplied with poultry feed via the distribution pipe. To vary the flow of the poultry feed from the auger pipe to the feed pans of the poultry feeders, a flow variation device or insert is provided to control the flow of poultry feed through a poultry feeder tube of one or more feeders. The flow variation device comprises an elongate body connected to an engagement device to engage the flow variation device within the feeder tube. In one aspect, the elongate body is adapted to have a first diameter at one end and a second diameter at the other end, where the second diameter is larger than the first diameter. Preferably, the device has a conical shape. Alternatively, the engagement device comprises an annular ring at one end and the elongate body is substantially cylindrical. The other end of the body also has a number of projections directed radially outward to interengage with the feeder tube.

39 Claims, 10 Drawing Sheets

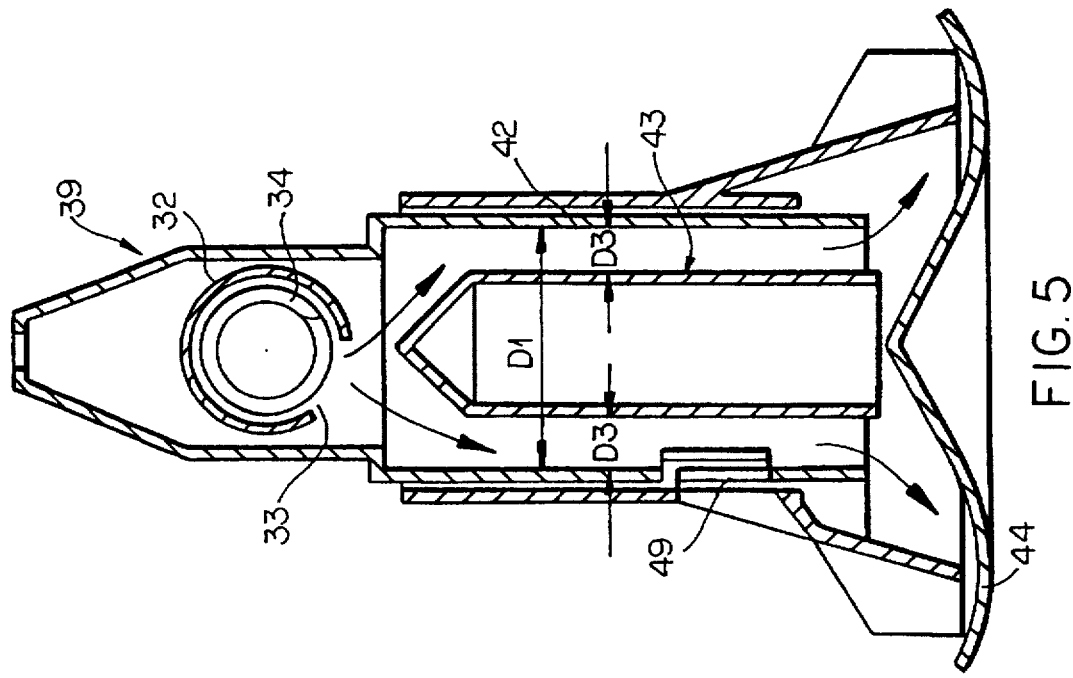
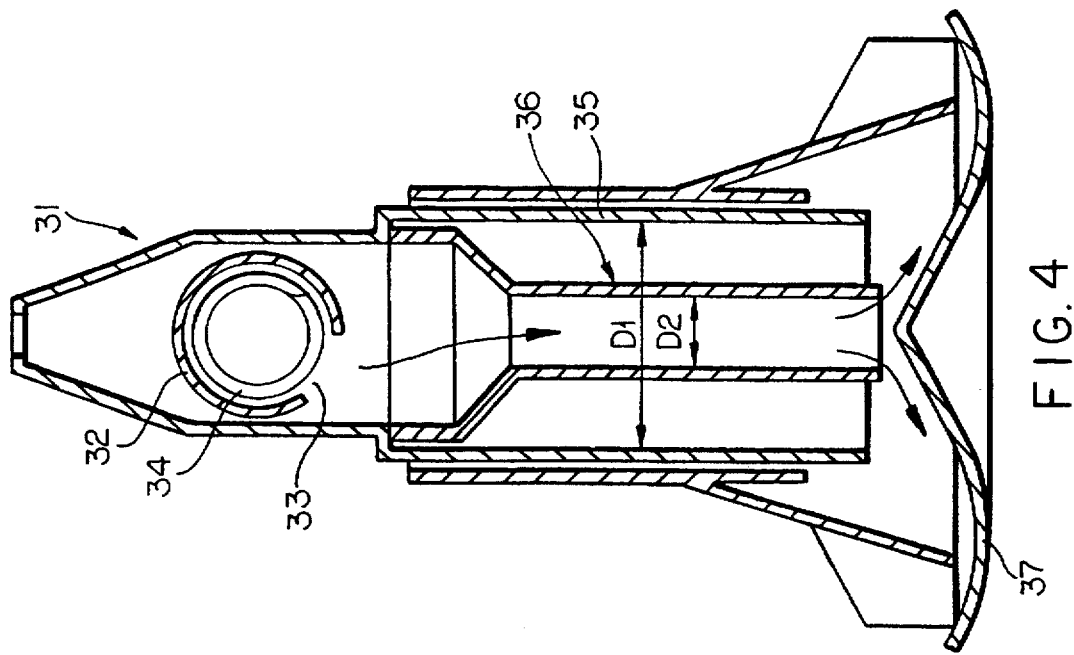

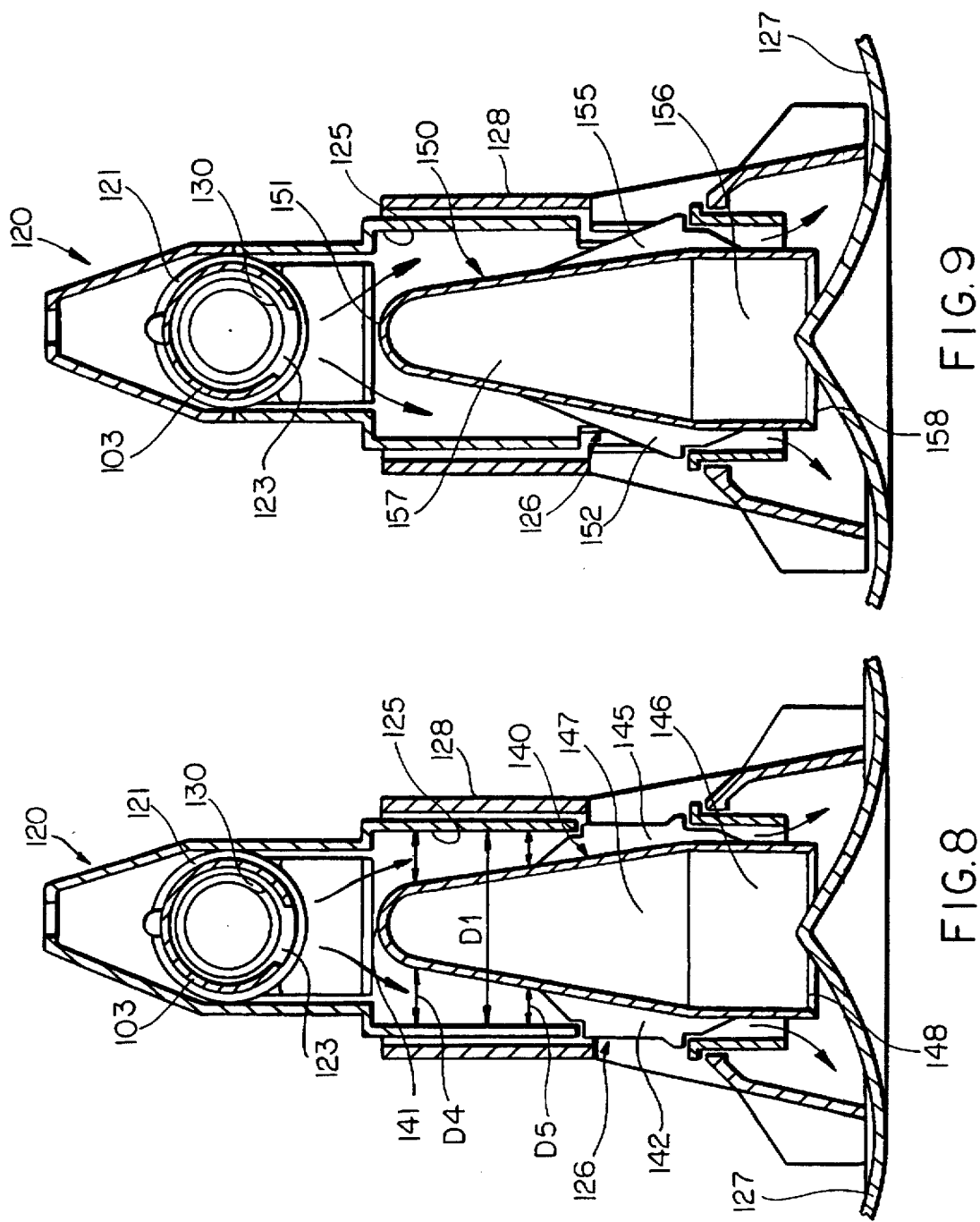

5,778,821

RESTRICTED FLOW POULTRY FEEDER

FIELD OF THE INVENTION

The present invention is directed towards the field of poultry feeders for dispensing food to poultry livestock. In particular, it is directed towards poultry feeders that ensure even distribution of poultry food in a poultry feeder system.

BACKGROUND OF THE INVENTION

Prior art arrangements will first be described with reference to FIGS. 1 and 2 of the drawings which respectively show a conventional poultry feeding system and a cross-sectional view through a conventional poultry feeder.

In the prior art, a poultry feeder system 1 shown in FIG. 1 typically includes an auger pipe 50, an auger (not shown), one or more motors 54,57, one or more hoppers 46,47, and a plurality of poultry feeders 51 to 53, 55 and 56. The hoppers 46 and 47 are connected to auger pipe 50 and receive poultry feed for the poultry feeder system 45 from a silo system (not illustrated) or by loading of feed from bags into the hoppers 46,47. The flexible auger (not shown) is rotatably disposed within the pipe 50 and is driven by the motor 54,57 for transporting the poultry feed. A large number of poultry feeders 51 to 53, 55 and 56 are located at intervals along the pipe 50 and, being conventional and well known in the art, are simply indicated by a block in FIG. 1. At each poultry feeder location, there is a feed opening (not shown) in the pipe 50 to allow the poultry feed to fall into the poultry feeders 51 to 53, 55 and 56.

A longitudinal cross-sectional view of a conventional poultry feeder tube 24 shown in FIG. 2 illustrates the outer and inner surfaces 25 and 26 of a poultry feeder (eg. poultry feeders 51 to 53, 55 and 56). The large internal diameter D of the inner surface 24 is indicated by a double-headed arrow. A feed opening 28 is provided in the pipe 50, and the auger 48 is rotatably disposed within the auger pipe 50 for transporting the poultry feed. Thus, the poultry feed falls into the feeder pan 30 through the large diameter (D), inner surface 26 of the conical feeder tube 24. Only a portion of a feeder pan 30 is shown in FIG. 2, as indicated by broken lines at each end. Further, a cage for the feeder being well-known in the art is not shown to simplify the drawings.

However, conventional poultry feeders 51 to 53, 55 and 56 utilising a feeder tube 24 such as the one shown in FIGS. 1 and 2 have several disadvantages. A first disadvantage resides in the poultry feed not being provided simultaneously and evenly at each poultry feeder 51 to 53, 55 and 56. That is, poultry feed that is put into the hoppers 46 and 47 quickly fills the feeder pan 30 of the adjacent poultry feeder 51 located beside hopper 47, for example, as the poultry food moves (as indicated by an arrow) through the pipe 50, but the more distant poultry feeders (such as 53) are filled more slowly and at a later time.

Such conventional poultry feeding systems are disadvantageous in that each standard poultry feeder requires a larger volume of poultry feed than is retained in the auger pipe 50 during each feeding cycle. For example, the auger pipe 50 typically consists of a one and three quarter inch or a two inch tube which can retain a measurable volume of poultry feed in the tube between the pans when the poultry feeding system 45 is stopped. When the poultry feeding system is restarted, if the poultry feeders 51 to 53, 55 and 56 are empty, each of the poultry feeders 51 to 53, 55 and 56 typically requires a larger volume of poultry feed than the measured volume of feed retained in the auger pipe 50 between the pans. Thus, initially after restarting the poultry feed system, the auger pipe 50 only delivers the measured volume of feed that is within the auger pipe 50. This creates a deficiency of feed in each pan. Consequently, there is a interval in which the poultry feeding system 45 does not contain sufficient poultry feed to simultaneously delivery feed to the birds on a continual basis. In turn, the birds rush to those poultry feeders.

In the foregoing circumstances, the birds rush to those of the poultry feeders immediately after hoppers 46,47, which have been filled first to obtain food since these pans are replenished first. Consequently, elevated levels of stress are experienced by the poultry, including "broiler" chickens, and the condition of the poultry is thereby adversely affected. In addition, due to congestion at the filled feeders and competition among the birds, each bird is not provided equal access to the feed. The body weight of the parent and grandparent stock of poultry that produce broiler and parent eggs, respectively, is an important factor in the ability of the poultry to produce eggs. In particular, the best performance of male birds is strongly influenced by their body weight which affects the number of eggs, the number of progeny, the hatchability of the eggs, and the growth rate of the resulting poultry that are produced.

Thus, it is highly desirable to provide an individual space in the poultry feeding system for each bird. The birds learn to go to the same space each time, and therefore it is important that poultry feed be delivered evenly and simultaneously to the feeders 51 to 53, 55 and 56 whenever the auger 48 starts.

Another disadvantage of the prior art is that the better quality food is not evenly distributed throughout the system. That is, the quality of feed that is provided at remote locations in relation to the hoppers is inferior. The better components tend to be deposited in the feeders closer to the hoppers. This is another reason that the poultry to rush toward the feeders containing better quality feed.

SUMMARY OF THE INVENTION

In accordance with a first aspect of the invention, there is disclosed a poultry feeder system comprising hopper means connected to an auger driven distribution pipe and a plurality of poultry feeders depending from said pipe and supplied with feed from said hopper means via said distribution pipe, wherein a flow variation means is located in said distribution pipe and/or said poultry feeders to vary the flow of feed from said pipe to the feed bowl of said feeders.

In accordance with a second aspect of the invention, there is disclosed a poultry feeding apparatus that can be coupled to a distribution pipe comprising:

a feeder tube for providing poultry feed to a feeder pan; and a feeder tube for providing poultry feed to a feeder pan; and feed restriction means disposed within said feeder tube, wherein said feed restriction means has a reduced aperture for providing greater resistance to a flow of said poultry feed within said feeder tube.

Preferably, said feed restriction means comprises a cylindrical member having a funnel-shaped upper member that provides a reduced internal dimension for said feeder tube.

Alternatively, the feed restriction means may comprise a sleeve located interior of said feeder tube that provides a reduced aperture to the volume of feed through the substantially annular space between said tube and the outer surface of said sleeve.

In accordance with a third aspect of the invention, there is disclosed a feed auger for distributing feed in a poultry feeder system, said auger comprising an auger driven distribution pipe having a plurality of flow apertures at spaced intervals therealong, said apertures being arranged to vary the flow of feed therethrough with distance along said pipe.

In accordance with a fourth aspect of the invention, there is disclosed a distribution pipe comprising:

a plurality of apertures, said plurality of apertures distributed along said distribution pipe at intervals, and one or more apertures of said plurality of apertures being rotated along the circumference of said distribution pipe.

In accordance with a fifth aspect of the invention, there is disclosed a distribution pip for a feed auger, said pipe comprising:

a plurality of distribution pipe segments, each distribution pipe segment of said plurality of distribution pipe segments having a plurality of apertures located at intervals along each distribution pipe segment at substantially the same circumferential position, said plurality of distribution pipe segments being progressively longitudinally rotated to provide changing resistance to a flow of said poultry feed with distance along said pipe.

In accordance with a sixth aspect of the invention, there is provided a flow variation device for controlling flow of poultry feed through a poultry feeder tube comprising:

an elongate body adapted to have, at least, a first diameter at one end and a second diameter at the other end thereof, wherein the second diameter is greater than the first diameter; and engagement means for positioning the body within an inner surface of the poultry feeder tube.

Preferably, the one end of the elongate body is located adjacent to an upper vertical end of the poultry feeder tube.

The first and second diameters of the elongate body and the inner surface of the poultry feeder tube define first and second cross-sectional areas wherein the second cross-sectional area is less than the first cross-sectional area. Still further, the elongate body has a substantially continuously increasing diameter transverse to the longitudinal extent of the body between the first diameter and the second diameter thereof.

Preferably, the elongate body consists substantially of a conical portion. Further, the elongate body consists of a cylindrical portion at the end thereof opposite to the apex of the conical portion.

Preferably, the engagement means comprises a plurality of protrusions, each protrusion having its longitudinal axis substantially parallel to the longitudinal axis of the elongate body. Further, each of the plurality of protrusions has a (first) notch incorporated therein for engaging an aperture formed in the feeder tube. Still further, each of the plurality of protrusions has a tab incorporated therein adjacent to the notch for engaging the aperture and for delimiting the vertical displacement of the elongate body within the feeder tube. Optionally, each of the plurality of protrusions has a second notch therein, the first and second notches engaging opposite surfaces of the aperture to rigidly maintain the elongate body within the inner surface of the feeder tube.

In accordance with a seventh aspect of the invention, there is provided a flow variation device as set forth in the preceding paragraphs in which each of the plurality of protrusions is adapted to provide means for vertically positioning the elongate body within the feeder tube to control the amount of poultry feed that can accumulate in a pan of a poultry feeder adjacent to the lower vertical end of the poultry feed tube.

In accordance with an eighth aspect of the invention, there is provided a poultry feeder system comprising a plurality of poultry feeders, wherein each poultry feeder has a flow variation device as set forth in the preceding paragraphs, that is disposed within a corresponding poultry feeder tube depending from an auger pipe of the system.

In accordance with a ninth aspect of the invention, there is provided a flow variation device for controlling flow of poultry feed through a poultry feeder tube comprising:

a main body adapted to form a duct;

occlusion means coupled to said main body to prevent substantially the flow of feed between said main body and said feeder tube; and spacing means coupled to said main body provides stable engagement between said main body and said feeder tube.

BRIEF DESCRIPTION OF THE DRAWINGS

Embodiments of the invention will now be described with reference to the drawings, in which:

FIG. 4 is a longitudinal cross-sectional view of a feeder tube having an interior sleeve, or insert, of reduced diameter to restrict the volume of feed within the poultry feeder of FIG. 3 in accordance with the first embodiment;

FIG. 5 is a longitudinal cross-sectional view of a feeder tube having a sleeve, or insert, disposed within it so that feed travels between the outside of the sleeve and the inside of the feeder tube in accordance with the second embodiment;

FIG. 8 is a longitudinal cross-sectional view of a feeder tube having an interior sleeve, or insert, of reduced diameter to restrict feed flow within the poultry feeder according to a fifth embodiment of the invention;

FIG. 9 is a longitudinal cross-sectional view of a feeder tube having a sleeve, or insert, according to a sixth embodiment of the invention;

DETAILED DESCRIPTION

Figure 3:
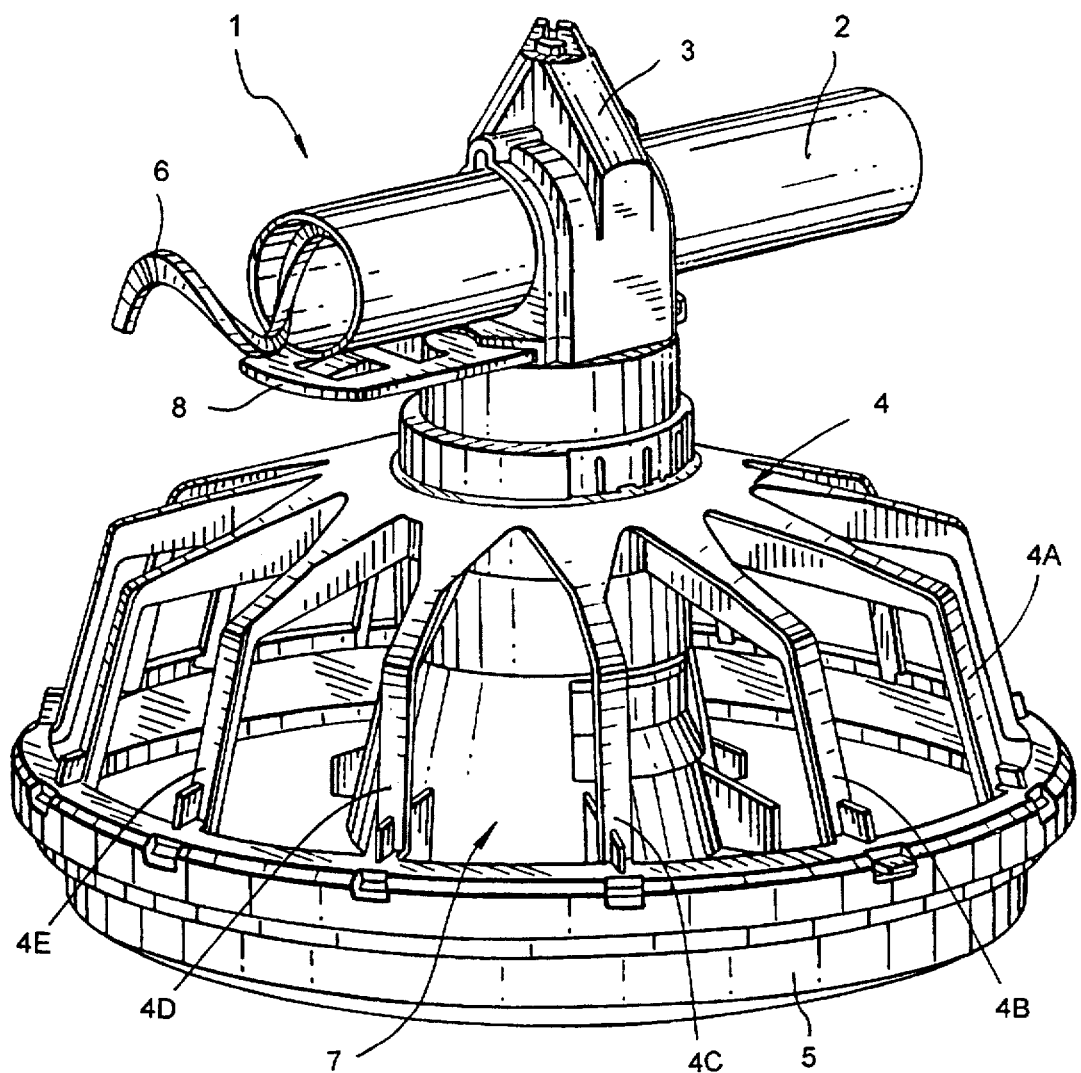
FIG. 3 is a perspective view of a poultry feeder for use with the first and second embodiments of the invention.

A poultry feeder shown in FIG. 3 includes a receiver 3, a feeder tube 7, a cage 4, and a feeder pan 5. An auger pipe 2 is coupled to the receiver 3 and incorporates a feed opening (not shown) disposed within the receiver 3. The receiver 3 is connected to the feeder tube 7. A high speed auger 6 is rotatably disposed with the pipe 2 to transport the poultry feed. It will be apparent to a person skilled in the art that FIG. 1 only illustrates a portion of auger pipe 2 to simplify the drawing.

As such, feeder tubes 31 and 39 of FIGS. 4 and 5 are generally depicted in FIG. 3 by the receiver 3/feeder tube 7 assembly. Likewise, auger pipe 2 of FIG. 3 generally depicts the auger pipe 32 of FIGS. 4 and 5.

The receiver 3 includes a shut-off valve having a shutter 8 for connecting and disconnecting the poultry feeder 1 to and from the auger pipe 2 The shutter 8 has a feed access aperture, and can be operated to enable or interrupt the flow of poultry feed from the pipe 2 into the feeder pan 5. The cage 4 includes a plurality of cage arms 4A–4E that extend from the feeder tube 7. The cage arms 4A–4E extend to a cage rim, which in turn surmounts a feeder pan 5.

Figure 1:
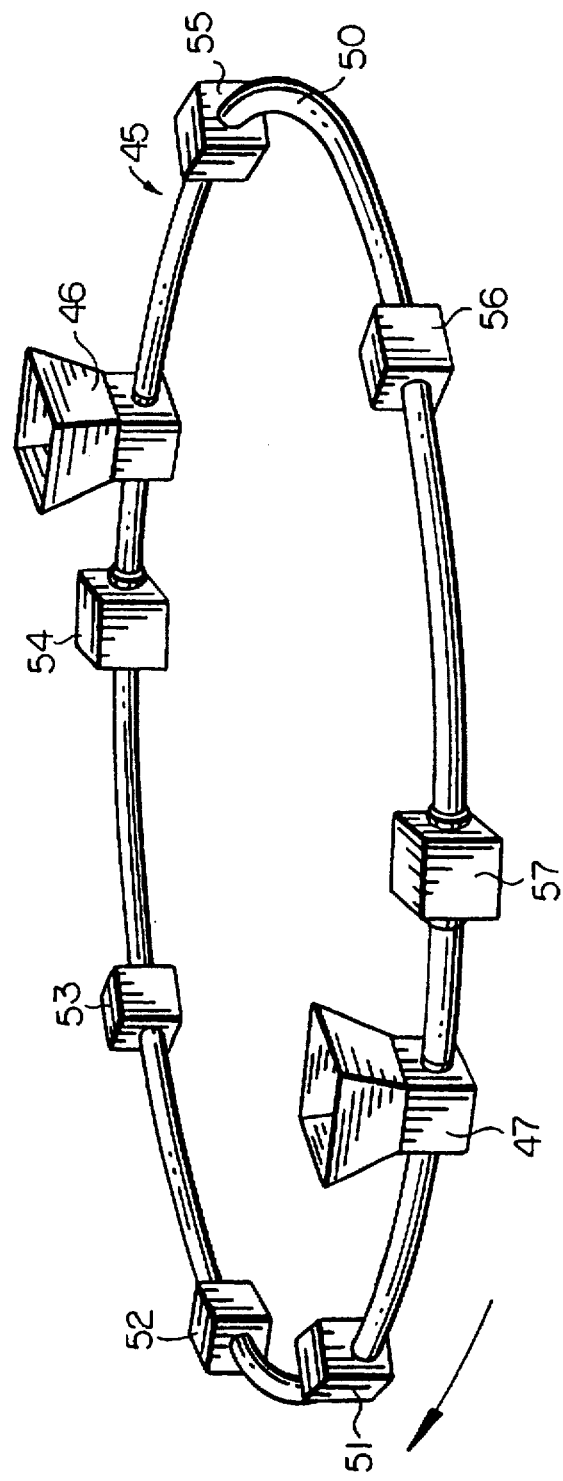
FIG. 1 is a block diagram of a conventional poultry feeding system.

FIGS. 4 and 5 illustrate feeder tubes 31 and 39 that can be used with the poultry feeder 1 of FIG. 1 in accordance with the teachings of the present invention. The feeder tube 31 according to the first embodiment shown in FIG. 4 (which can be used in the poultry feeder 1) has an inner sleeve, or insert, 36 of reduced diameter disposed within it. An auger 34 transports the poultry feed through the auger pipe 32. A feed opening, or aperture 33, in the pipe 32 permits the poultry feed to fall into the interior of the feeder tube 31.

The feeder tube 31 has an inner diameter D1 which is larger than the diameter D2 of the tunnel-shaped or tapered sleeve 36. The lower portion of the sleeve 36 is essentially cylindrical in shape. Thus, the reduced inner diameter D2 of the sleeve 36 provides an increased resistance to the flow and therefore a reduced volume of feed (indicated by arrows) from the feed opening 33 in the pipe 32.

Preferably, the feeder tube 31 and the sleeve 36 of the first embodiment are utilised at each poultry feeder 52 to 53, 55 and 56, thereby delivering a smaller amount of feed at any instant to each feeder. However, this advantageously provides feed nearly simultaneously to each poultry feeder 51 to 53, 55 and 56. Because the plurality of feeders 52 to 53, 55 and 56 simultaneously fill up more evenly, there is accordingly a reduction in the stress experienced by the poultry with consequent production advantages.

Alternatively, the feeder tube 31 and the sleeve 36 of the first embodiment can be utilised in feeders (eg 53 and 56) further away from the hoppers 46 and 47 whereas poultry feeders (51) closer to the hoppers 46 and 47 utilise conventional feeder tubes.

A feeder tube 39 according to a second embodiment shown in FIG. 5 has an inner sleeve 43 disposed within the inner surface 42 of the feeder tube 39. The feeder tube 39 is connected to the auger pipe 32 containing a feeder opening 33. The poultry feed is transported in the auger pipe 32 using auger 34. The inner sleeve 43 disposed within the inner surface 42 of the feeder tube 39 defines an annular region having a reduced effective diameter D3 in relation to the diameter D1 of the inner surface 42 of the feeder tube 39 (the flow of feed through the feeder tube 39 being indicated by arrows). Thus, a feeder system utilising the poultry feeder tube 39 of the second embodiment as described above in connection with the first embodiment, also provides a more even, simultaneous distribution of feed in the poultry feeder system.

It will be apparent to a person skilled in the art that the insert sleeves 36 and 43 according to the first and second embodiments may be secured within the feeder tube using a number of techniques without departing from the scope and spirit of the present invention, including the techniques described with reference to the fifth and sixth embodiments.

A particular advantage of the second embodiment of FIG. 5 is that the feeder tube 39 can be provided with a conventional side opening 49 which is used in the feeding of small chickens, for example.

Figure 6:
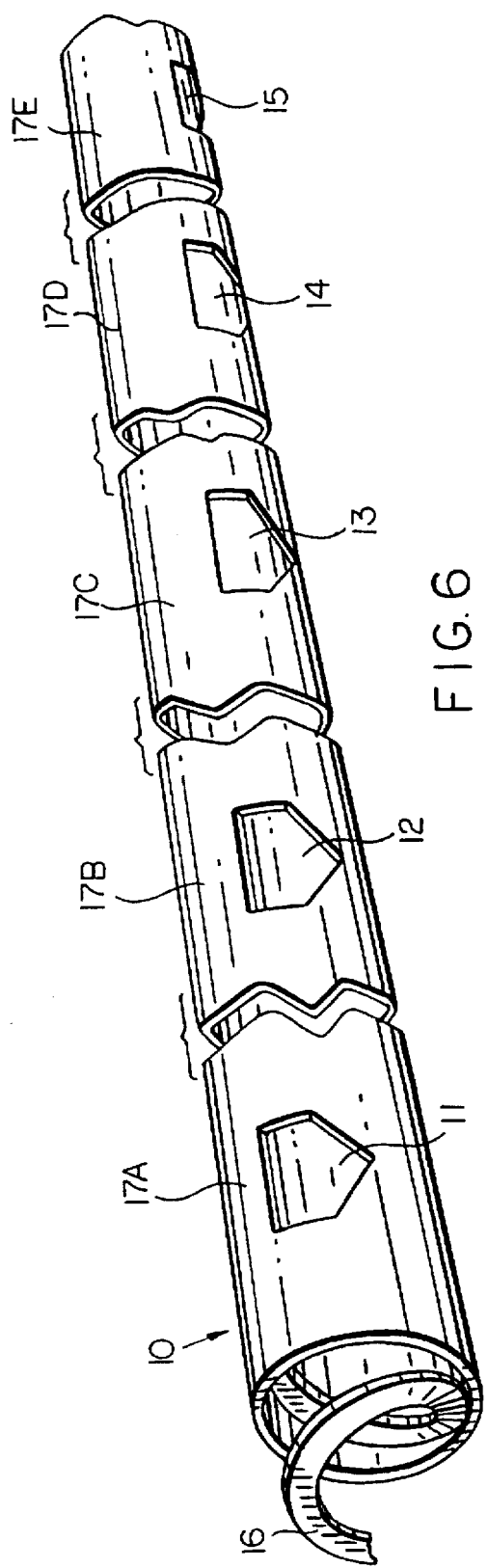
FIG. 6 is a side perspective foreshortened view of an auger pipe having circumferentially rotated feed openings according to a third embodiment.

An auger pipe 10 according to a third embodiment shown in FIG. 6 includes an auger 16 and a plurality of feed openings 11–15. The auger pipe 10 is illustrated as a number of foreshortened regions 17A–17E. However, it should be apparent to a person skilled in the art that the pipe 10 is a single pipe. The feed openings 11–15 are located at spaced intervals along the longitudinal extent of the pipe 10, and are each circumferentially rotated a small distance in relation to the preceding feed opening to provide staged or staggered progressively reducing feed levels in the distribution pipe 10. Preferably, the feed openings have a tapered or triangular shape in their lower region.

As seen in FIG. 6, the feed opening 11 is located substantially in the vertical side of segment 17A, whereas the feed opening 15 at the opposite end of the distribution pipe 10 is in the horizontal base of the segment 17E and thus faces in the direction of the feeder pan of the corresponding poultry feeder (not shown). Thus, the poultry feed transported through the distribution pipe 10 will more rapidly fill the feeder pan of a poultry feeder connected to the pipe segment 17E than a poultry feeder connected to the pipe segment 17A, where the poultry feeders are of the same type. Thus, the distribution pipe 10 can be programmed to provide a more even and simultaneous distribution of poultry feed in a poultry feeding system.

Figure 7:
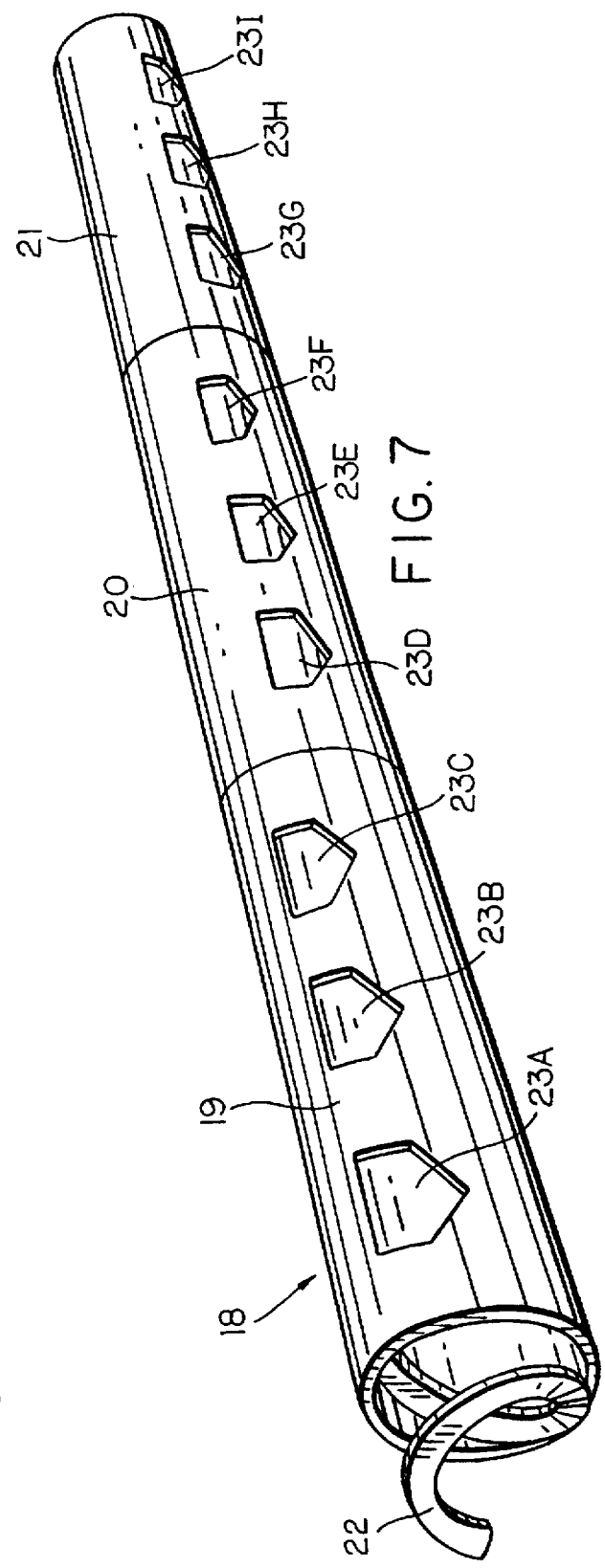
FIG. 7 is a side perspective foreshortened view of an auger pipe consisting of a plurality of pipe segments each having feed openings at the same circumferential position according to a fourth embodiment.

An auger pipe 18 according to a fourth embodiment of the invention is shown in FIG. 7 and consists of an auger 22 and a plurality of pipe segments 19–21. The pipe 18 is formed by coupling a number of the pipe segments 19–21 together. Each pipe segment 19–21 has a number of a plurality of feed openings 23A–23I, respectively, that are located at intervals each pipe segment. The feed openings of each pipe segment are positioned at a fixed circumferential position. Thus, for example, the pipe segment 19 includes a number feed openings 23A–23C each located at the same circumferential position.

The pipe segments 19–21 are coupled together to form the distribution pipe 18, and to provide progressively reducing resistances to the flow of feed in the direction of flow, the pipe segments 19–21 are each rotated circumferentially in relation to the preceding pipe segment. For example, the pipe segment 19 has a number of apertures 23A–23C that are positioned substantially in the vertical side of the pipe 18, whereas the apertures 23G–23I of the pipe segment 21 are rotated circumferentially in relation to pipe segments 19 and 20 so that the apertures 23G–23I are located in the substantially horizontal base of the pipe and so face substantially downward toward the feeder pan (not shown). Thus, the apertures 23G–23I of the pipe segment 21 provide a lower discharge level of feed into the poultry feeders than do pipe segments 19 and 20. It will be clear to a person skilled in the art that the volume of feed available at each poultry feeder connected to a feed opening of pipe segment 20 is intermediate that of pipe segments 19 and 21. As described above, the pipe 18 thereby provides poultry feed more evenly and simultaneously in a poultry feeder system.

Optionally, the arrangements of FIGS. 4 and 5 may be combined with the arrangements of FIGS. 6 and 7 so that, as the distance from the hopper increases, the openings in the auger pipe are positioned lower and the effective aperture of the feed tube increases. In this way, although the amount of feed within the auger pipe decreases with distance from the hopper, the rate at which feed is supplied to the feed bowls may be fine-tuned so that the rate is substantially constant relative to distance from the hopper.

In addition, when the auger ceases to rotate, some feed is left in the auger pipe and is thus ready to supply the feeder pans with feed substantially instantaneously after the auger rotation re-commences.

Thus, each the embodiments of the invention improve the distribution of feed by providing equal and nearly simultaneous delivery of feed to each poultry feeder. In addition, the embodiments improve the delivery of food of equal quantity and quality to each poultry feeder by delivering it in smaller amounts. Still further, the embodiments facilitate and ensure equal access of the poultry to the feed. This is accomplished by using a high speed auger to deliver the feed and to provide adequate amounts of feed at any instant to each poultry feeder.

Figure 10:
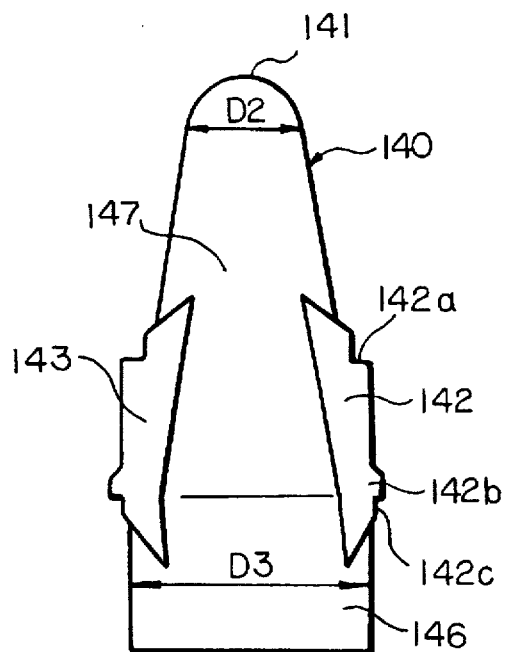
FIG. 10 is a front elevational view of the insert according to the fifth embodiment.

A further inner sleeve, or insert 140, for use in a feeder tube according to the fifth embodiment is illustrated in FIGS. 8, 11, 12 and 13. The insert 140 shown in FIG. 10 has a substantially conical, or frusto conical, body 147 that preferably transitions to a substantially cylindrical portion 146 at the end opposite to the apex 141. The insert 140 is preferably made of plastics, fibreglass, or a like material that can provide a rigid body. Further, the insert 140 is preferably hollow. The shape of the insert 140 is indicated in FIG. 10 in which the diameter D2 in the region adjacent to the apex 141 is less than the diameter D3 of the cylindrical portion 146, with the diameter between the apex 141 and the cylindrical portion 146 continuously increasing therebetween. The insert 140 has a number of narrow, elongated protrusions 142 to 145, preferably consisting of four fins, extending radially from the insert 140 and generally positioned in the region of the transition between the cone-shaped portion 147 and the cylindrical portion 146 of the insert 140. The protrusions are hereinbelow referred to as "fins". Further, the longitudinal axes of the fins 142 to 145 are oriented substantially parallel to the longitudinal axis of the insert 140.

As shown in FIG. 10, the fin 142, which is exemplary of the remaining fins 143 to 145 (fins 144 and 145 are not shown), has the following shape which is described as it is traversed from its first end toward the apex 141 to the opposite end of the fin 142 near the end 148 of the insert 140. The fins are preferably substantially narrower in width that they are in height or length. The first, upper surface of the fin 142 slopes upwardly at an acute angle relative to the surface of the conical body 147 and ends at an "L-shaped" notch 142A. The next segment of the fin 142 has a surface that is substantially parallel to the longitudinal axis of the insert 140 and extends from the notch 142A to a smaller, fin-shaped tab 142B. The tab 142B extends outwardly in relation to the radial extent of the fin 142 with respect to the longitudinal axis of the insert 140. Another notch 142C is incorporated in the fin 142 adjacent to the tab 142B. The lower segment of the fin 142 has a surface that transitions at an obtuse angle from the notch 142C to the surface of the cylindrical portion 146 of the insert 140. As will described below, the plurality of fins 142 to 145 are provided to position and engage the insert 140 within an inner surface of a feeder tube of a poultry feeder so that the insert 140 acts as a flow variation device affecting the flow of poultry feed from the auger pipe 103 into a feeder pan.

The insert 140 is shown centrally disposed within a poultry feeder 120 in FIG. 8. The poultry feeder 120 depends from the auger pipe 103, which has an opening 123 in the lower portion of the pipe 103. The auger pipe 103 extends through an opening 121 of the poultry feeder 120 and has the auger 130 disposed within its inner surface. The flow of poultry feed through the poultry feed 120 is illustrated with downwardly directed arrows between the inner surface 125 of the poultry feeder tube 128 and the surface of the insert 140.

The fins 142 and 145 are illustrated in FIG. 8 and show that the shape of the fin is used to securely position the insert 140 within the inner surface 125 of the poultry feeder 120 so that the fins 142 to 145 are engaged with the surfaces of openings 126 formed in the sides of feeder tube 128. In particular, for example, the lower notch 142C and the tab 142B of fin 142 engage with the lower surface of the opening 126 and the upper notch 142A of fin 142 engages with the upper surface of opening 126. The remaining fins 143 to 145 similarly engage the respective openings 126 of the feeder rube 128. In this way, the insert 140 can be rigidly positioned in the feeder tube 128.

Thus, the insert 140 shown in FIGS. 8, 10, 12 and 13 preferably has four attachment fins 142 to 145, each of which has two locking points per fin, for positioning the insert 140 in the feeder tube 128.

As indicated in FIG. 8, the inner surface 125 of the feeder tube 128 has a substantially constant diameter D1. Thus, the insert 140 presents a decreasing annular cross-sectional area (indicated by arrows D4) to the flow of poultry feed as it falls from the opening 123 towards the pan 127. A portion of the poultry feed will flow out of the openings 126 of the feeder 120 while the remainder flows into the pan between the tube and the cylindrical portion 146 of the insert 140. While the interior surface 125 of the feeder tube 128 has been described as having a substantially constant diameter, it will be obvious to those skilled in the art that the feeder tube may be practiced with various other shapes without departing from the scope and spirit of the invention.

Figure 13:
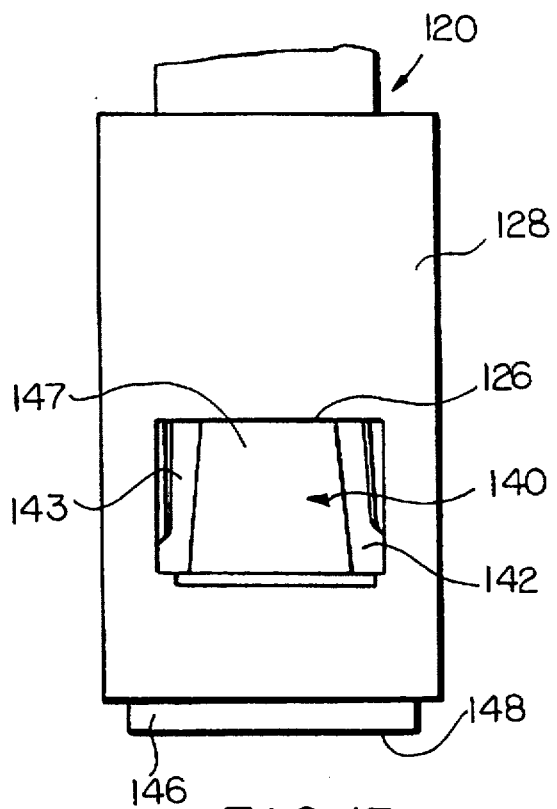
FIG. 13 is a front elevational view illustrating the insert according to the fifth embodiment disposed within the poultry feeder tube.

A partial front elevational view of the insert 140 located in the feeder tube portion 128 is shown in FIGS. 13. The pair of fins 142 and 143 are engaged within the upper and lower surfaces of the rectangular opening 126 and abut the right and left vertical surfaces of the opening 126. Similarly, the other pair of fins 144 and 145 can be engaged in the opposite opening 126 of the poultry feeder tube 128 (not shown). Part of the lower cylindrical portion 146 adjacent to the end 148 of the insert 140 is shown extending from the lower portion of the poultry feeder tube 128. A portion of the conical body 147 can also be seen through the opening 126. Thus, FIG. 13 illustrates the engagement of the fins 142 and 143 within the aperture 126 to securely position the insert 140 within the feeder tube 128.

Figure 2:
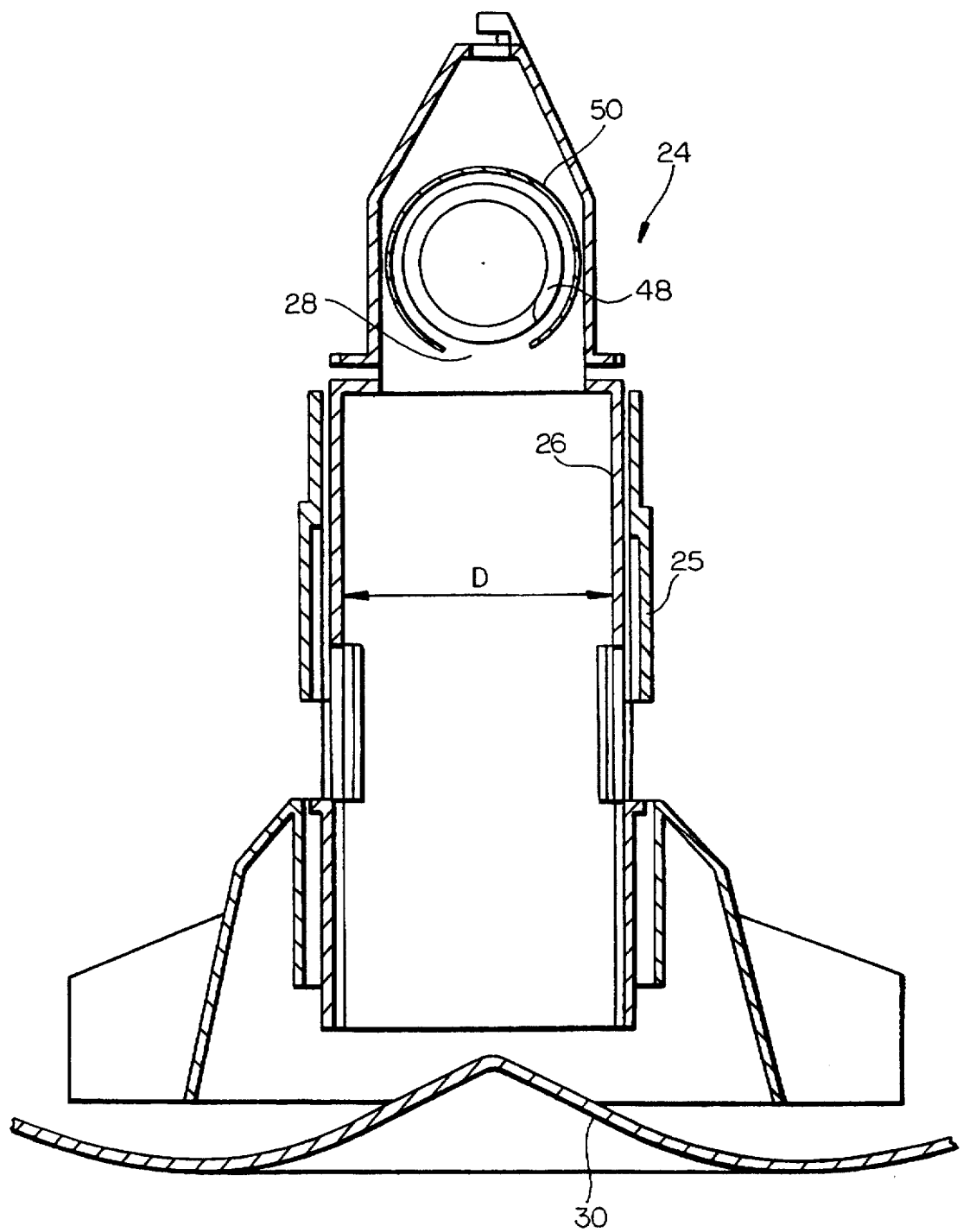
FIG. 2 is a longitudinal cross-sectional view of a conventional poultry feeder tube having a large inner diameter.
Figure 12:
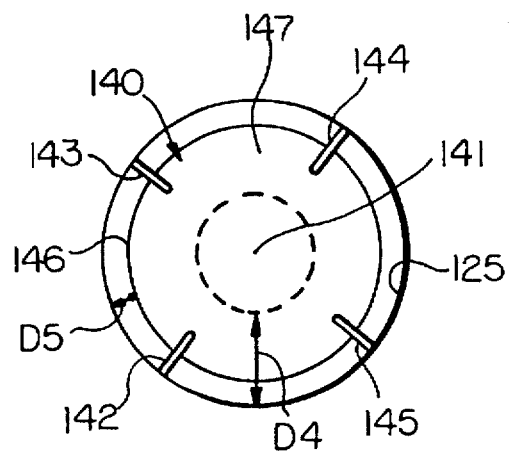
FIG. 12 is a plan view of the insert according to the fifth embodiment disposed within the inner surface of a poultry feeder tube.

A plan view of the insert 140 disposed within the inner surface 125 of the feeder tube 128 is shown in FIG. 12. The apex 141 is illustrated at the centre of the inner surface 125 of the feeder tube 128. The fins 142 to 145 are used to engage the openings 126 (not shown) in the feeder tube 128. A dashed-line circle centred around the apex 141 indicates the upper portion of the conical portion 147 of the insert 140 having diameter D2 (shown in FIG. 4). This part of the conical portion 147 defines the annular cross-sectional void (indicated by arrow D4 in FIGS. 2 and 6) between the insert 140 and the inner surface 125 of the feeder tube 128 encountered by poultry feed as it falls from the opening 123 of the auger pipe 103 into the feeder tube 128 toward the feeder pan 127. In the cylindrical portion 146 adjacent to the other end 148 of the insert 140, the annular cross-sectional area decreases to that represented by arrow D5.

The insert 140 advantageously enables light weight grains of feed to be delivered to each poultry feeder by providing a varying cross-sectional area to the flow of poultry feed. Commonly, such light weight grains are treated with molasses or similar gluey or adhesive substances.

For example, initially all of the pans in the poultry feeding system are assumed to be empty. Sufficient poultry feeders are provided along the auger pipe 103 to ensure that there is a place for every bird to eat. The auger pipe 103 preferably holds a measurable volume of feed between each pair of poultry feeders. When the poultry feeding system is started, an over supply of poultry feed for each pan is available as the insert 140 limits the volume of feed that can be dispersed into each pan. The insert 140 advantageously provides a decreasing annular cross-sectional area for the flow of poultry feed and results in the delivery of the drop of feed to the pan 127. Thus, each poultry feeder receives a drop of food so that the birds do not rush from poultry feeders that are empty towards those pans that receive poultry feed. The speed and diameter of the auger pipe 103 keeps all pans topped up without having to program the auger pipe 103, as is done in the prior art. Consequently, there is no stress on the birds. Unlike the prior art, there remains a portion of poultry feed in the poultry feeder system at all times that can be dropped into each of the next poultry feeders when the system is restarted. That is, the supply volume of the poultry feeder system exceeds the maximum feeding volume of the poultry feeder due to placement of the insert 140 in the feeder tube 128. For example, the auger pipe may hold 780 grams of feed in the portion of the pipe between each pair of feeders. The initial drop may consist of 500 to 580 grams of feed, thereby providing a remaining portion of at least 200 grams in the pipe for the next drop.

The feeding intervals of the birds will depend upon their age. For example, young birds are typically fed at intervals of 20 to 30 minutes, whereas older birds are fed at intervals of up to four hours. Between the age of six weeks and twenty weeks, feed is restricted to such birds to obtain the best body weight for them. The surplus of feed in the auger pipe means that the feed auger pipes no longer have to be programmed to try and evenly distribute feed between the pans.

Figure 11:
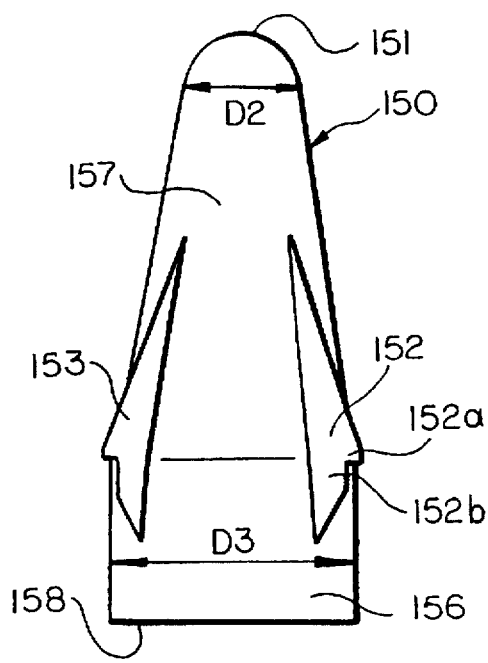
FIG. 11 is a front elevational view of the insert according to the sixth embodiment.

A sixth embodiment of the invention is illustrated in FIGS. 9 and 11. Again, the insert 150 consists of a conical, or frusto-conical, section 157 that transitions to a cylindrical portion 156. The apex 151 of the insert 150 is positioned in the feeder tube 128 near the opening 123 in the auger pipe 103, whereas the opposite end 158 is adjacent to the pan 127. The insert 150 has a number of protrusions 152 to 155, which preferably consist of four fins, to position the insert 150 within the inner surface of the feeder tube 128. However, the fins 152 to 155 of the sixth embodiment have a different shape than that of the fins 142 to 143 of the fifth embodiment.

For example, the fin 152 shown in FIG. 11 extending from the conical portion 157 of the insert 150 toward the cylindrical portion 156 has a first segment in which the surface extends upwardly at an acute angle relative to he surface of the insert 150 and ends in a fin shaped tab 152A. A notch 152B extends from the tab 152A and connects with a segment of the fin that has a surface extending downwardly at an obtuse angle towards the cylindrical portion 156.

As shown in FIG. 9, the tab (eg. 152A) and notch portion (eg. 152B) of the fins 152 to 155 engage the lower side of the openings 126 in the feeder tube 128. The insert 150 is again self-centred within the inner surface 125 of the feeder tube 128 but is wobbly as poultry feed flows downwardly through the feeder tube 128 since the fins do not engage the upper surface of the openings 126. This wobbly motion of the insert 150 to the flow of poultry feed can be advantageous since play in the annular cross-sectional area adjacent to the apex 151 of the insert 150 can prevent clogging of poultry feed in the upper portion of the poultry feeder tube 128 of the poultry feeder 120. Thus, these embodiments of the invention provide an insert for use in a poultry feeder tube that is advantageous since it reduces or eliminates the clogging of poultry feed in the upper portion of the poultry feeder tube. In particular, it is advantageous for use with chaff-like (or otherwise light and fluffy) feed that can become clogged in the poultry feeder tube after falling out of the aperture in the auger pipe.

These embodiments of the invention can be easily popped into a feeder tube and snap into place for this purpose. The decreasing annular cross-sectional area provided within the poultry feeder tube by the insert affects a better distribution of feed in the poultry feeder system.

The present invention can also be practised with an insert having fins adapted to permit the relative position between the end 149,158 of the insert 140,150 in respect to the upper surface of the pan 127 of the poultry feeder to be adjusted. This may be particularly advantageous in that such adjustments would allow different amounts and types of feed to be delivered in the system. For example, by increasing or decreasing the distance between the end 148 of the insert 140 and the upper surface of the pan 127, increased or decreased amounts of poultry feed could be delivered to each poultry feeder.

It will be apparent to a person skilled in the art that while the insert 140,150 preferably has a cylindrical portion 146, 156, modifications can be made to the shape of the insert 140,150 without departing from the scope and spirit of the invention.

Figure 14:
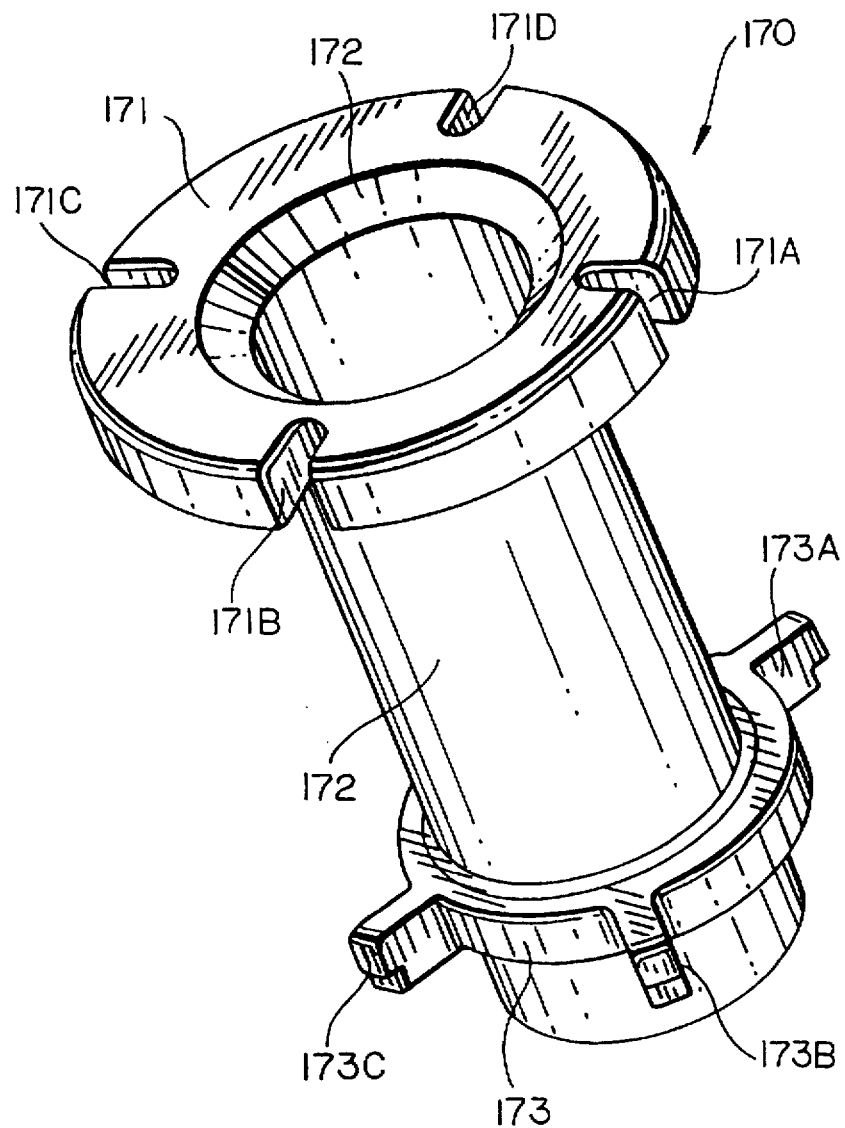
FIG. 14 is a perspective view of an insert according to a seventh embodiment of the invention.
Figure 15:
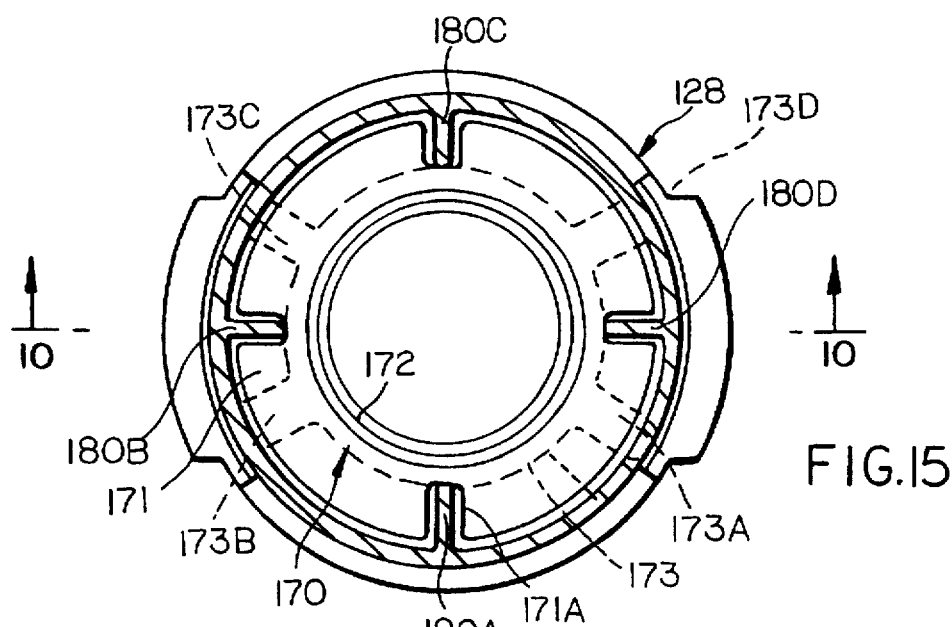
FIG. 15 is a top plan view of the insert of FIG. 14 disposed in a poultry feeder tube.
Figure 16:
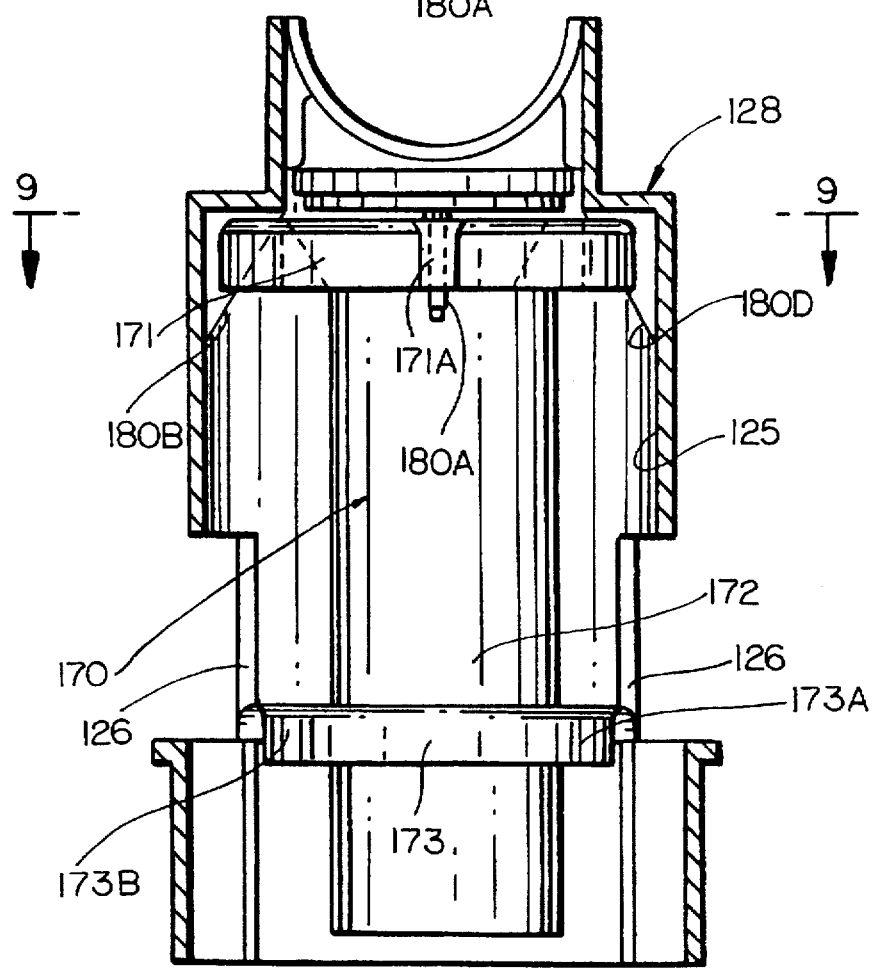
FIG. 16 is a side elevational view of the insert of FIG. 14 disposed within the poultry feeder tube.

Another inner sleeve, or insert, for use in a feeder tube according to a seventh embodiment is illustrated in FIGS. 14 to 16. The insert 170 has a substantially cylindrical body, or duct, 172 coupled to an occlusion member 171, and a spacer member 173 coupled adjacent to the opposite end of the insert 170. It will be apparent to a person skilled in the art that while the occlusion member 171 is described as being disposed at one end of the duct 172 and the spacer member 173 as being disposed adjacent to an opposite end thereof, various other configurations of the occlusion member 171 and the spacer member 173 can be practiced without departing from the scope and spirit of the invention. For example, the occlusion member 171 may be offset from the end of the duct 172 so that the top surface of the occlusion member 171 is displaced lengthwise along the duct 172 from the end thereof. Likewise, the spacer member 173 may be positioned at a different location in relation to the duct 172. The configuration of the occlusion member 171 and the spacer member 173 is guided by the requirement to ensure that the flow of poultry feed through the poultry feeder tube 128 is substantially directed through the interior of the duct 172 and that the occlusion member 171 and the spacer member 173 provide stable positioning of the insert 70 within the feeder tube 128.

The occlusion member 171 has an annular form that can be concentrically disposed in line or about the duct 172. It also has a number of slots 171A to 171D formed in the sides thereof disposed about the circumference of the member 171 which are adapted to engage interior surfaces of the feeder tube 128 so as to prevent rotation within and about the longitudinal axis of the feeder tube 128. Preferably, the number of slots 171A to 171D is four. As shown in FIG. 15, the interior surface of the feeder tube 128 has four tabs 180A to 180D formed in the upper surfaces thereof which are provided to engage the slots 171A to 171D of the occlusion member 171.

The spacer member 173 shown in FIG. 14 has a substantially annular shape so that the duct 172 can be concentrically disposed therein. The four spacer legs 173A to 173D extend radially from the body of the spacer member 173 so that the ends of the spacer legs 173A to 173D engage the windows 126 of the feeder tube 128 to securely and firmly position the insert 170 within the feeder tube 128. As shown in FIGS. 15 and 16, each of the spacer legs 173A and 173D has a notch cut-out of the lower portion of the terminal end of each of the legs 173A and 173D. The small cut-out portion of each spacer leg 173A to 173D is provided for catching or engaging the interior edge of the respective windows 126 of the feeder tube 128. The spacer legs 173A to 173D each preferably extend 1 mm into the windows 126. The notches 171A to 171D locate the duct 172 centrally and the spacer legs 173A to 173D extending into the windows 126 prevent the insert 170 falling away from the top of the outer tube 128.

The insert 170, including the occlusion member 171, the duct 172 and the spacer member 173, is preferably made of plastics, or the like rigid materials.

Preferably, the inner opening of the occlusion member is conically shaped so that it tapers inwardly to the corresponding opening of the duct 172. That is, the diameter of the upper portion of the opening of the occlusion member 171 is greater than the diameter of the lower portion of the opening adjacent to the duct 172 which preferably coincides therewith.

In the embodiment shown in FIGS. 14 to 16, the duct 172 preferably consists of a chamfered plastic pressure pipe. The occlusion member 171 is a hardened plastic spigot and the spacer member 173 is made of the same material as the occlusion member 171. The occlusion member 171 and the spacer member 173 are optionally glued to the duct 172. However, it will be apparent to a person skilled in the art that the occlusion member 171 and or the spacer member 173 can be affixed to the duct 172 using other methods including snap fittings, thermal bonding, and the like. Preferably, the entire insert 170 consists of an integral body formed, by moulding for example, of a single material such as plastic or metal. That is, the occlusion member 171, the duct 172 and the spacer member 173 may each be made from plastics, metal or similar rigid materials. Still further, the duct 172 may be made of an inflexible material while the occlusion member 171 and/or the spacer member 173 may be made from a more flexible material. For example, the occlusion member 171 may be formed from rubber or hardened rubber so as to provide a more snug fit when engaged in the feeder tube 128 to position the duct 172 within the interior surface 125.

The construction of the insert 170 enables the insert 170 to be simply put into the feeder tube 128 by push fitting the insert 170 through the lower end of the feeder tube 128 and twisting the insert 170 so that the slots 171A to 171D of the occlusion member 171 align and engage with the respective tabs or protrusions 180A to 180D formed in the interior surface 125 of the feeder tube 128. As shown in FIG. 15, the spacer legs 173A to 173D of the spacer member 173 are positioned so that they bisect the circumferential interval between the tabs 180A to 180D of the feeder tube 128. This is further illustrated in FIG. 16 in which the tab 180A (indicated by dashed lines) of the feeder tube 128 is shown disposed within the slot 171A of the occlusion member 171 so that the spacer legs 173A to 173D are positioned penetrating the openings 126 in the feeder tube body 128 in a notched or grooved surface of the feeder tube 128. As shown in FIG. 16, the notches of legs 173A and 173B catch on the inner surfaces of openings 126.

The life span of laying birds is typically 52 weeks to 64 weeks of age. There are two main conventional methods that are used to rear breeders. One method is called the day old to end of lay technique in which the day olds stay in the same shed until they start to lay until they furnish laying at around 64 weeks of age. This technique has numerous disadvantages including the requirement that varying amounts of feed be programmed in the poultry feeding system delivered to each of the feeders at different times in the life span of the birds. The other method is to rear day old birds in the separate shed until they reach point of lay (typically 24 to 26 weeks of age) and then move them to separate sheds during the laying cycle of their life span. As might be expected, different amounts and types of feed are provided in the respective sheds.

The insert 170 can advantageously be used in poultry feeders to feed birds up to end of lay by enabling changing feed formulations to meet both the ages of the birds and the available ingredients to achieve an efficient feed. Using insert 170, the birds may be kept in a single shed and the insert 110 disposed in the feeder tube 128 to regulate the delivery of poultry feed to each of the poultry feeders.

As described above, the insert according to the embodiments of the invention also ensures that a portion of the poultry feed remains in the auger pipe recirculates through the system. This is particularly important since the first drop of food is eaten much more quickly by the birds than it can be replaced.

The foregoing describes only some specific embodiments of the present invention and modifications, obvious to those skilled in the art, can be made thereto without departing from the spirit and scope of the invention.

We claim:

1. A poultry feeding apparatus that can be coupled to a distribution pipe, said apparatus comprising:

a feeder pan a feeder tube for providing poultry feed to said feeder pan; and feed restriction means, disposed within said feeder tube and having a reduced aperture, for providing greater resistance to a flow of said poultry feed within said feeder tube, wherein said feed restriction means comprises a cylindrical member having a funnel-shaped upper member that provides a reduced internal dimension for said feeder tube.

2. A flow variation device for controlling flow of poultry feed through a poultry feeder tube having an aperture formed therein, said flow variation device comprising:

an elongate body adapted to have, at least, a first diameter at one end and a second diameter at the other end thereof, wherein the second diameter is greater than the first diameter, wherein the first and second diameters of the elongate body and the inner surface of the poultry feeder tube define first and second substantially annular cross-sectional areas wherein the second cross-sectional area is less than the first cross-sectional area; and engagement means for positioning the body within an inner surface of the poultry feeder tube, wherein the engagement means comprises a plurality of protrusions, each protrusion having a longitudinal axis substantially parallel to a longitudinal axis of the elongate body, each of the plurality of protrusions has a first notch incorporated therein for engaging said aperture, a tab incorporated in the protrusion adjacent to the first notch for engaging the aperture and for delimiting the vertical displacement of the elongate body within the feeder tube, and a second notch, where the first and second notches engaging opposite surfaces of the aperture to rigidly maintain the elongate body within the inner surface of the feeder tube.

3. The flow variation device according to claim 2, wherein the one end of the elongate body is located adjacent to an upper vertical end of the poultry feeder is tube.

4. The flow variation device according to claim 2, wherein the elongate body has a substantially continuously increasing diameter transverse to the longitudinal extent of the body between the first diameter and the second diameter thereof.

5. The flow variation device according to claim 2, wherein the elongate body consists substantially of a conical portion.

6. The flow variation device according to claim 5, wherein the elongate body consists of a cylindrical portion at the end thereof opposite to the apex of the conical portion.

7. The flow variation device according to claim 2, wherein said flow variation device is made of plastic.

8. The flow variation device according to claim 2, wherein each of the plurality of protrusions is adapted to provide means for vertically positioning the elongate body within the feeder tube to control the amount of poultry feed that can accumulate in a pan of a poultry feeder adjacent to the lower vertical end of the feeder tube.

9. A flow variation device for controlling flow of poultry feed through a poultry feeder tube, said flow variation device comprising:

a main body adapted to form a duct;

occlusion means coupled to the main body for preventing substantially the flow of feed between the main body and the feeder tube, wherein the occlusion means comprises an annular disc having an outer diameter substantially equal to that of the inner surface of the feeder tube and at least one notch formed in the side of the occlusion means, where each notch is adapted to receive a corresponding protrusion formed in the feeder tube; and spacing means coupled to the main body to provide stable engagement between the main body and the feeder tube.

10. The flow variation device according to claim 9, wherein the occlusion means is adapted to complement the interior shape of the feeder tube to provide a snug fit therebetween.

11. The flow variation device according to claim 9, wherein the spacing means is displaced from the occlusion means along a longitudinal axis of the main body to provide longitudinally separated contact points between the flow variation device and the feeder tube.

12. The flow variation device according to claim 9, wherein the occlusion means engages with said corresponding protrusion of the feeder tube to align the flow variation device within the poultry feeder tube.

13. The flow variation device according to claim 9, wherein the spacing means comprises an annular body having at least two protrusions extending radially therefrom to engage an aperture formed in the feeder tube.

14. The flow variation device according to claim 13, wherein each protrusion has a notch formed in a terminal end thereof for engagement with said aperture of said feed tube.

15. The flow variation device according to claim 9, wherein the flow variation device is integrally made from an inflexible material.

16. The flow variation device according to claim 9, wherein the main body is made from an inflexible material.

17. The flow variation device according to claim 16, wherein the occlusion means and the spacing means are formed of a flexible material selected from the group consisting of rubber, hardened rubber, foam, pressurised foam, and wood.

18. The flow variation device according to claim 9, wherein said flow variation device is made of plastic.

19. A flow variation device for controlling flow of poultry feed through a poultry feeder tube, said flow variation device comprising:

a main body adapted to form a duct;

occlusion means coupled to the main body to prevent substantially the flow of feed between the main body and the feeder tube; and spacing means coupled to the main body to provide stable engagement between the main body and the feeder tube, wherein the spacing means comprises an annular body having at least two protrusions extending radially therefrom to engage an aperture formed in the feeder tube.

20. The flow variation device according to claim 19, wherein the spacing means is displaced from the occlusion means along a longitudinal axis of the main body to provide longitudinally separated contact points between the flow variation device and the feeder tube.

21. The flow variation device according to claim 19, wherein the occlusion means is adapted to complement the interior shape of the feeder tube to provide a snug fit therebetween.

22. The flow variation device according to claim 19, wherein the occlusion means comprises an annular disc having an outer diameter substantially equal to that of the inner surface of the feeder tube.

23. The flow variation device according to claim 22, wherein the occlusion means has engagement means adapted therein to engage the feeder tube to align the flow variation device within the poultry feeder tube.

24. The flow variation device according to claim 23, wherein the engagement means comprises at least one notch formed in the side of the occlusion means each adapted to receive a corresponding protrusion formed in the feeder tube.

25. The flow variation device according to claim 19, wherein each protrusion has a notch formed in a terminal end thereof for engagement with said aperture of said feeder tube.

26. The flow variation device according to claim 19, wherein the flow variation device is integrally made from an inflexible material.

27. The flow variation device according to claim 19, wherein the main body is made from an inflexible material.

28. The flow variation device according to claim 27, wherein the occlusion means and the spacing means are formed of a flexible material selected from the group consisting of rubber, hardened rubber, foam, pressurised foam, and wood.

29. The flow variation device according to claim 19, wherein said flow variation device is made of plastic.

30. A flow variation device for controlling flow of poultry feed through a poultry feeder tube, said flow variation device comprising:

a main body adapted to form a duct;

occlusion means coupled to the main body to prevent substantially the flow of feed between the main body and the feeder tube; and spacing means coupled to the main body to provide stable engagement between the main body and the feeder tube, wherein the spacing means comprises an annular body having at least two protrusions extending radially therefrom to engage an aperture formed in the feeder tube, each of said protrusions having a notch formed in a terminal end thereof for engagement with said aperture of said feeder tube.

31. The flow variation device according to claim 30, wherein the spacing means is displaced from the occlusion means along a longitudinal axis of the main body to provide longitudinally separated contact points between the flow variation device and the feeder tube.

32. The flow variation device according to claim 30, wherein the occlusion means is adapted to complement the interior shape of the feeder tube to provide a snug fit therebetween.

33. The flow variation device according to claim 30, wherein the occlusion means comprises an annular disc having an outer diameter substantially equal to that of the inner surface of the feeder tube.

34. The flow variation device according to claim 33 wherein the occlusion means has engagement means adapted therein to engage the feeder tube to align the flow variation device within the poultry feeder tube.

35. The flow variation device according to claim 34, wherein the engagement means comprises at least one notch formed in the side of the occlusion means each adapted to receive a corresponding protrusion formed in the feeder tube.

36. The flow variation device according to claim 30, wherein the flow variation device is integrally made from an inflexible material.

37. The flow variation device according to claim 30, wherein the main body is made from an inflexible material.

38. The flow variation device according to claim 37, wherein the occlusion means and the spacing means are formed of a flexible material selected from the group consisting of rubber, hardened rubber, foam, pressurised foam, and wood.

39. The flow variation device according to claim 30, wherein said flow variation device is made of plastic.

* * * * *